United States Patent
Perry et al.

(10) Patent No.: US 8,539,693 B2
(45) Date of Patent: Sep. 24, 2013

(54) BRAKE MECHANISM FOR A DEVICE FOR DRYING FOODS AND OTHER ITEMS

(75) Inventors: Marco Perry, Brooklyn, NY (US);
Mark Prommel, Brooklyn, NY (US);
David Block, Brooklyn, NY (US)

(73) Assignee: Helen of Troy Limited, Belleville, St. Michael (BB)

( * ) Notice: Subject to any disclaimer, the term of this patent is extended or adjusted under 35 U.S.C. 154(b) by 289 days.

(21) Appl. No.: 13/072,822

(22) Filed: Mar. 28, 2011

(65) Prior Publication Data
US 2012/0246959 A1 Oct. 4, 2012

(51) Int. Cl.
F26B 17/30 (2006.01)
(52) U.S. Cl.
USPC ........ 34/317; 34/318; 34/322; 34/58; 99/511; 99/536; D7/665; 188/72.9
(58) Field of Classification Search
USPC ................ 34/312, 317, 318, 322, 58, 60, 90, 34/201, 218; 99/495, 511, 536; D7/665; 188/72.9
See application file for complete search history.

(56) References Cited

U.S. PATENT DOCUMENTS

| | | | | |
|---|---|---|---|---|
| 2,500,368 A | * | 3/1950 | Lund | 68/23 R |
| 2,635,445 A | * | 4/1953 | Smith | 68/12.05 |
| 3,024,637 A | * | 3/1962 | Hughes et al. | 68/12.17 |
| 3,090,472 A | * | 5/1963 | Morrison | 192/12 BA |
| 3,740,975 A | * | 6/1973 | Cornelius | 68/18 F |
| 3,893,843 A | * | 7/1975 | Fry et al. | 134/10 |
| 4,237,912 A | * | 12/1980 | Hill et al. | 134/57 R |
| 4,329,859 A | * | 5/1982 | Roberts | 68/23 R |
| 4,412,390 A | * | 11/1983 | Grant | 34/58 |
| 5,501,241 A | * | 3/1996 | Jacobson | 134/95.2 |
| 6,018,883 A | | 2/2000 | Mulhauser | |
| 6,473,988 B1 | | 11/2002 | Mulhauser et al. | |
| 6,510,785 B1 | | 1/2003 | Margolin | |
| 6,899,021 B2 | * | 5/2005 | Riede | 99/495 |
| 7,111,546 B2 | | 9/2006 | Siegel et al. | |
| D530,989 S | | 10/2006 | Mellen et al. | |
| 7,448,315 B2 | * | 11/2008 | Mulhauser et al. | 99/495 |
| 7,621,213 B2 | | 11/2009 | Wong | |
| 7,681,495 B2 | | 3/2010 | Wan et al. | |
| 7,975,605 B2 | * | 7/2011 | Wan et al. | 99/495 |
| 2004/0168583 A1 | * | 9/2004 | Riede | 99/495 |
| 2005/0204935 A1 | * | 9/2005 | Siegel | 99/495 |

(Continued)

FOREIGN PATENT DOCUMENTS

JP 2005287617 A * 10/2005

OTHER PUBLICATIONS

The Webstaurant Store, 2.5 Gallon Plasitc Salad Spinner/Dryer with Brake, http://www.webstaurantstore.com/2-5-gallon-plastic-salad-spinner-dryer-with-brake/599SD6.html, 4 pages.

(Continued)

*Primary Examiner* — Steve M Gravini (57) ABSTRACT

A brake assembly for reducing the rotational velocity the spinning basket of a food spinning device applies a frictional force to an annular ridge on the lid of the spinning basket. A brake button movably disposed in a cover of the spinning device includes flexible pinching arms having cam surfaces. The cam surfaces of the flexible pinching arms extend through a guide aperture, thereby causing the pinching arms to flex toward each other when the brake button is depressed and to apply the frictional engagement to the annular ridge.

17 Claims, 9 Drawing Sheets

(56) References Cited

U.S. PATENT DOCUMENTS

| | | | |
|---|---|---|---|
| 2006/0144257 A1* | 7/2006 | Cheng et al. ................ | 99/511 |
| 2006/0207441 A1* | 9/2006 | Mulhauser et al. ........... | 99/495 |
| 2007/0006742 A1 | 1/2007 | Paradise et al. | |
| 2007/0137504 A1 | 6/2007 | Wan et al. | |
| 2007/0256315 A1* | 11/2007 | Wong ........................... | 34/58 |
| 2008/0210103 A1 | 9/2008 | Wan et al. | |
| 2008/0223226 A1 | 9/2008 | Holcomb et al. | |
| 2008/0277513 A1 | 11/2008 | Holcomb et al. | |
| 2009/0114104 A1 | 5/2009 | Sawhney et al. | |
| 2010/0154131 A1* | 6/2010 | Paul et al. ...................... | 8/159 |
| 2010/0263555 A1* | 10/2010 | Mah et al. ..................... | 99/495 |
| 2012/0246959 A1* | 10/2012 | Perry et al. .................... | 34/58 |
| 2013/0009783 A1* | 1/2013 | Tran .............................. | 340/669 |

OTHER PUBLICATIONS

CHEF-MASTER.COM, ChefMaster 5 Gallon Salad Dryer, http://www.chef-master.com/salad_dryer_90005.php, 2 pages.

The Webstaurant Store, 5 Gallon Plasitc Salad Spinner/Dryer with Brake, http://www.webstaurantstore.com/5-gallon-plastic-salad-spinner-dryer-with-brake/599SD12.html, 5 pages.

Zyliss Smart Touch Salad Spinner, 4 pages http://www.chefscatalog.com/product/24155-zyliss-salad-spinner.aspx.

* cited by examiner

BRAKE MECHANISM FOR A DEVICE FOR DRYING FOODS AND OTHER ITEMS

The present disclosure relates to spinning devices for drying wet food, such as salad spinners, and more particularly to braking systems for reducing or stopping the rotation of the spinning device.

BACKGROUND

Various types of salad spinners are known for drying, or otherwise removing moisture, from salad and other foods. Such devices generally include some type of a bowl, a cover and a basket, which may also have a lid, adapted to spin within the bowl by some type of mechanical actuator. The centrifugal forces caused by the rotational velocity of the basket relative to the bowl, causes water and moisture within the food or salad to be separated and collected within the bowl. Mechanical actuators typically used on salad spinners have included hand crank mechanisms, pull strings and pump/screw mechanisms, for example.

Generally, these devices have relied on frictional interaction between bearing surfaces, for example, to allow the rotation of the basket to a stop after it has been spun to dry food. Such devices generally have not included a braking structure for stopping the spinning of the basket. In such cases, the user must typically wait until the spinning basket stops before removing the cover of the container and lid from the basket to access to the food within the basket. A braking structure is desirable so that a user would not have to open the cover to manually stop a spinning basket or to wait for bearing surface friction to eventually stop the basket.

Figure 1:
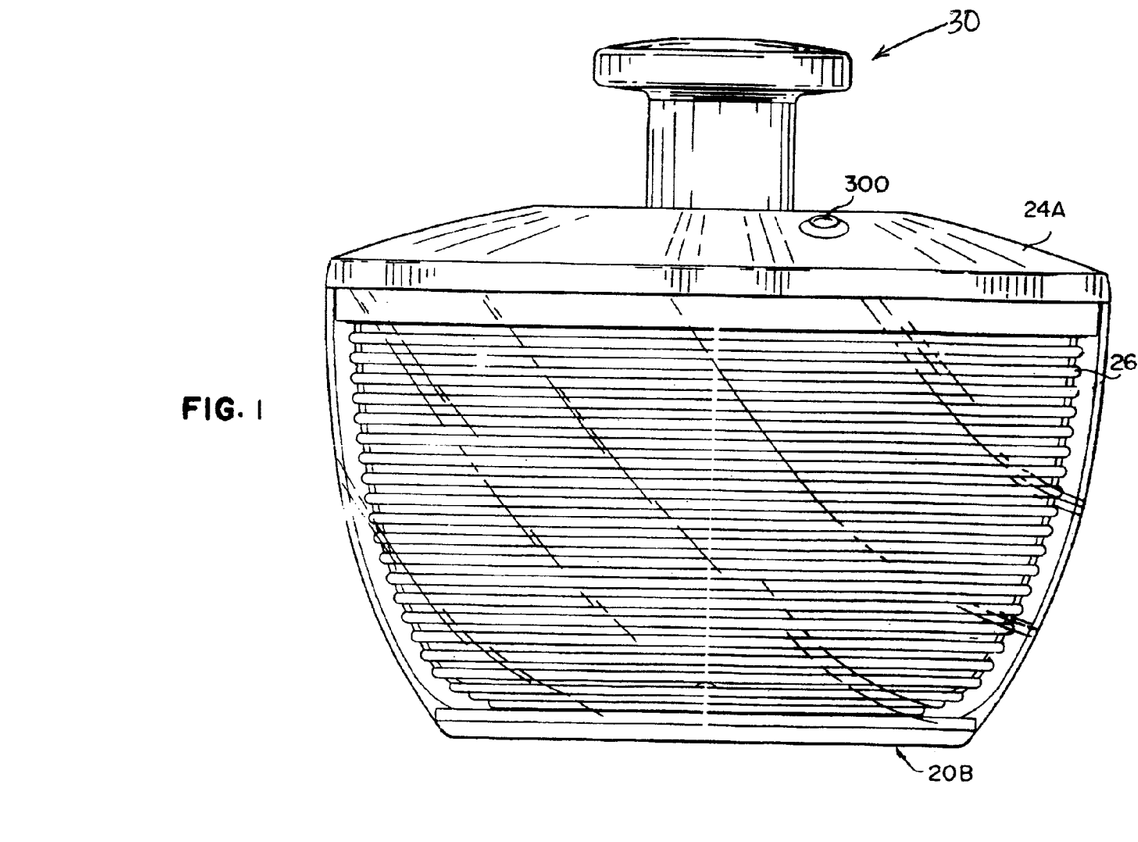
FIG. 1 is a perspective view of a typical food spinning apparatus according to the PRIOR ART, for which the present invention can be incorporated.
Figure 2:
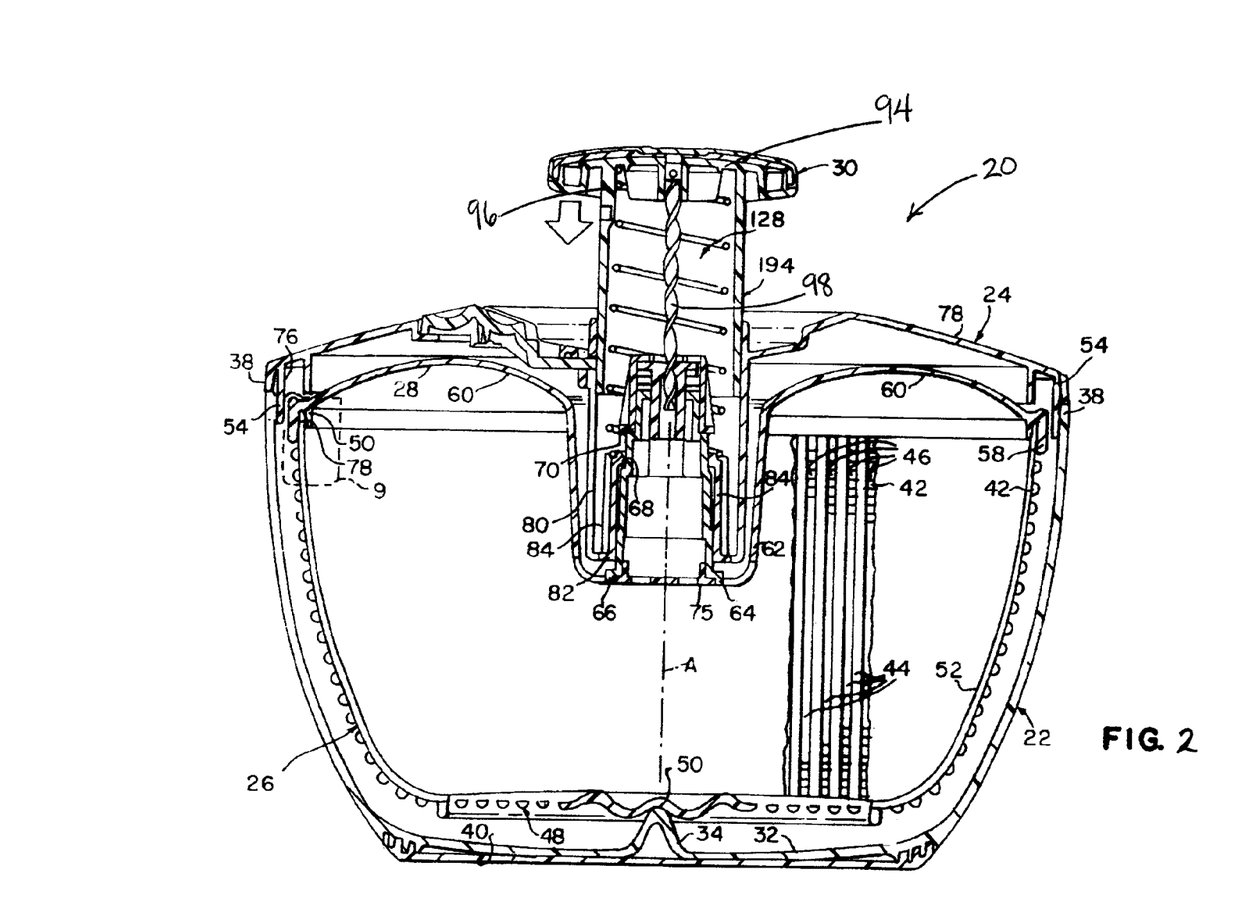
FIG. 2 is a cross sectional view of a typical food spinning apparatus according to the PRIOR ART, for which the present invention can be incorporated.

Referring to FIGS. 1-2, exemplary devices for drying food are reproduced, in part, from FIGS. 20 and 3, respectively, of U.S. Pat. No. 6,018,883 to Mulhauser (incorporated herein), to show the basic features of a salad spinner of the type to which the disclosure herein may be generally applied, although the present invention may be applied as well to other types of similar spinning devices and structures and is not limited to food drying or salad spinners. Devices of this general nature, like that of another exemplary device shown in FIG. 2 from U.S. Pat. No. 5,992,309 to Mulhauser et. al (incorporated herein), include a salad spinner 20 with a container having a bowl 22 and a cover 24 for the bowl 22, a perforated basket 26 disposed in the bowl 22, a lid 28 releasably coupled the basket 26, and a drive assembly 30 adapted to rotate the perforated basket 26 about an axis A relative to the container. With particular reference to FIG. 1 herein, the bowl 22 includes an alternative salad spinner 20B, which is substantially identical to the salad spinner 20, except a brake assembly 300 is provided to reduce and/or stop the rotation of the basket 26, and a cover 24A, slightly different than cover 24 in FIG. 2, to accommodate the brake assembly 300.

Figure 3:
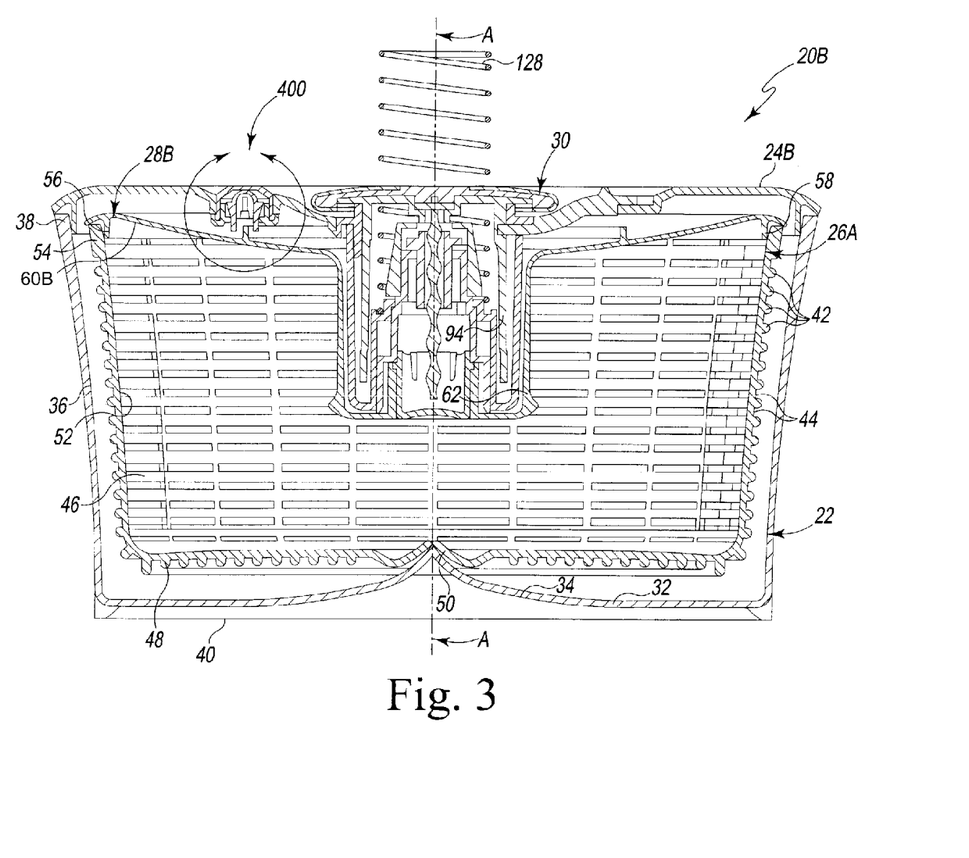
FIG. 3 is a cross sectional view of a typical food spinning apparatus incorporating an embodiment of the present invention.

For reference purposes, the descriptions of the foregoing devices from U.S. Pat. No. 6,018,883 to Mulhauser and U.S. Pat. No. 5,992,309 to Mulhauser et. al, the bowl 22 of FIG. 2 is generally circular in shape and has a central vertical axis A and a bottom wall 32 with a cone-shaped projection 34 disposed in its center. The bowl 22 also includes a sidewall 36 terminating in a top edge 38 and a foot 40 connected to the bottom wall 32, preferably made of a non-slip material. Generally, the elements of the device in FIG. 2 are numbered the same as their generally corresponding elements of one embodiment of the device of the disclosure as shown in FIG. 3.

The basket 26 in FIG. 2 includes a plurality of latitudinal, coaxial circular ribs 42 connected by a plurality of longitudinal ribs 44 of various lengths. The ribs 42 and 44 cooperate to define a plurality of various sized, generally rectangular apertures 46, which are sized and shaped to allow liquid to pass therethrough. The basket 26 also includes a bottom 48 having a cone-shaped projection 50 at its center which sits atop cone-shaped projection 34 to form a rotational bearing. The ribs 42 and 44 together form a sidewall 52 terminating at a top edge 54.

The lid 28 in FIG. 2 includes a cylindrical peripheral sidewall 56 having a plurality of ribs 58 projecting outwardly therefrom. The lid 28 includes a generally convex annular surface portion 60 connected to the circular sidewall 56, a frustroconical shaped central portion 62 depending from the annular surface portion 60, a radially inwardly extending bottom surface portion 64 integral with the lower end of the frustroconical shaped surface portion 62 and a tubular, upwardly projecting portion 66 integral and substantially coaxial with the bottom surface portion 64. The upwardly projecting portion 66 varies in diameter and includes shoulder surfaces 68, 70 formed thereon. The upwardly projecting portion 66 also includes a slot 71 disposed above shoulder surface 70. The circular sidewall 56 of lid 28 is adapted to be releasably coupled to top edge 54 of basket 26. In an embodiment, the lid 28 is adapted to be releasably coupled to top edge 54 with a mesh engagement with ribs 58.

As seen further in FIG. 2, the cover 24 includes a cylindrical sidewall 76 having an outer diameter substantially equal to the inner diameter of the top edge 38 of the bowl 22, thereby forming a releasable connection therebetween, such as, for example, a simple abutment or loose friction fit. In an embodiment, the releasable connection may simply allow the cover 24 to rest on the bowl 22 and be disposable thereon. The cover 24 also includes an upper surface portion 78, a depending, substantially cylindrical central surface portion 80, an annular bottom surface portion 82 and a generally cylindrical upwardly projecting portion 84 disposable coaxially about a portion of the upwardly projecting portion 66 of the lid 28. The upwardly projecting portion 84 has a radially inturned end 86 at its upper end which abuts shoulder surface 68 of upwardly projecting portion 66. The upwardly projecting portion 84 includes a plurality of axial ribs 88 projecting radially outwardly therefrom. The upper ends of ribs 88 and portions 90 of the end 86 form a generally annular groove 91 therebetween.

The drive assembly 30 of FIG. 2 includes a linearly reciprocating handle structure 94 (or plunger assembly) moveable along vertical axis A. The reciprocating handle structure 94 includes a disc shaped upper end 96, or button structure, and a coaxial cylindrical sidewall 98 depending therefrom. The drive assembly 30 includes a conversion mechanism for converting the reciprocating movement of the handle structure 94 to rotary motion of the basket 26. The conversion mechanism 104 includes an elongated helical screw shaft 106 coaxial with the handle structure 94 and connected at one end to the disc shaped upper end 96, preferably by a pin 107 (shown in FIG. 4 of the '833 patent). The elongated helical screw shaft 106 extends a slight distance below the lower end of the cylindrical sidewall 98. The drive assembly 30 in FIG. 2 also includes a helical compression spring 128 seated against the disc shaped upper end portion 96 of the reciprocating handle structure 94.

As mentioned previously, FIG. 1 shows an alternative salad spinner 20A from the '883 patent which is substantially identical to the salad spinner 20 shown in FIG. 1 from that patent, except that a brake assembly 300 is provided in a slightly modified cover 24A to stop rotation of the basket 26.

The apparatus described in U.S. Pat. No. 6,018,883 includes a least one type of braking mechanism for use in a food spinner. The braking mechanism is carried by the bowl cover and engages the basket cover to stop rotation of the basket assembly. A brake pad is configured for applying friction against the basket cover upon application of the braking mechanism. This type of breaking mechanism imparts in off-center downward force upon the cover of a spinning basket. Such a force may increase wear on certain bearing surfaces of the basket and/or mechanical actuator and may not be efficient for stopping rotation of the basket.

SUMMARY

The present disclosure provides a device for drying food and other items. The device includes a bowl having a bottom wall and a sidewall terminating in a top edge, a cover removably coupled to the top edge of the bowl, a basket assembly including a basket and a removable lid disposed in the bowl and rotatable relative to the bowl about an axis, and a brake assembly carried by the cover and engageable with the lid for stopping rotation of the basket assembly. The cover includes a button having a caliper like structure operably coupled to the button that moves downwardly when pressed so that two fingers of the structure move towards each other to clamp and frictionally engage an annular upstanding ridge on the lid, thereby reducing and/or stopping rotational movement of the basket. The fingers and the upstanding ridge extend substantially parallel to the axis of rotation of the spinning basket and the fingers can be compressed together against the ridge as they extend through a guide channel of the brake assembly.

BRIEF DESCRIPTION OF THE DRAWINGS

The disclosure is illustrated in the figures of the accompanying drawings which are meant to be exemplary and not limiting, in which like references are intended to refer to like or corresponding parts, and in which.

DETAILED DESCRIPTION

While this disclosure is susceptible of embodiments in many different forms, there is shown in the drawings and will herein be described in detail a preferred embodiment of the disclosure with the understanding that the present disclosure is to be considered as an exemplification of the principles of the disclosure and is not intended to limit the broad aspect of the disclosure to embodiments illustrated.

Referring to FIG. 3, the present invention includes some elements similar to those in FIGS. 1 and 2 and, for that reason among others, some of those elements shown in FIG. 3 are correspondingly numbered with their generally corresponding elements in FIGS. 1 and 2. The main (but not the only) differences between the salad spinner 20B shown in FIG. 3 and the salad spinners 20A and 20 shown respectively in FIGS. 1 and 2 concern the brake actuator assembly 400 in the modified bowl cover 24B and the modified basket lid 28B on the modified basket 26A that stops rotational movement of the modified basket 26A.

Figure 4:
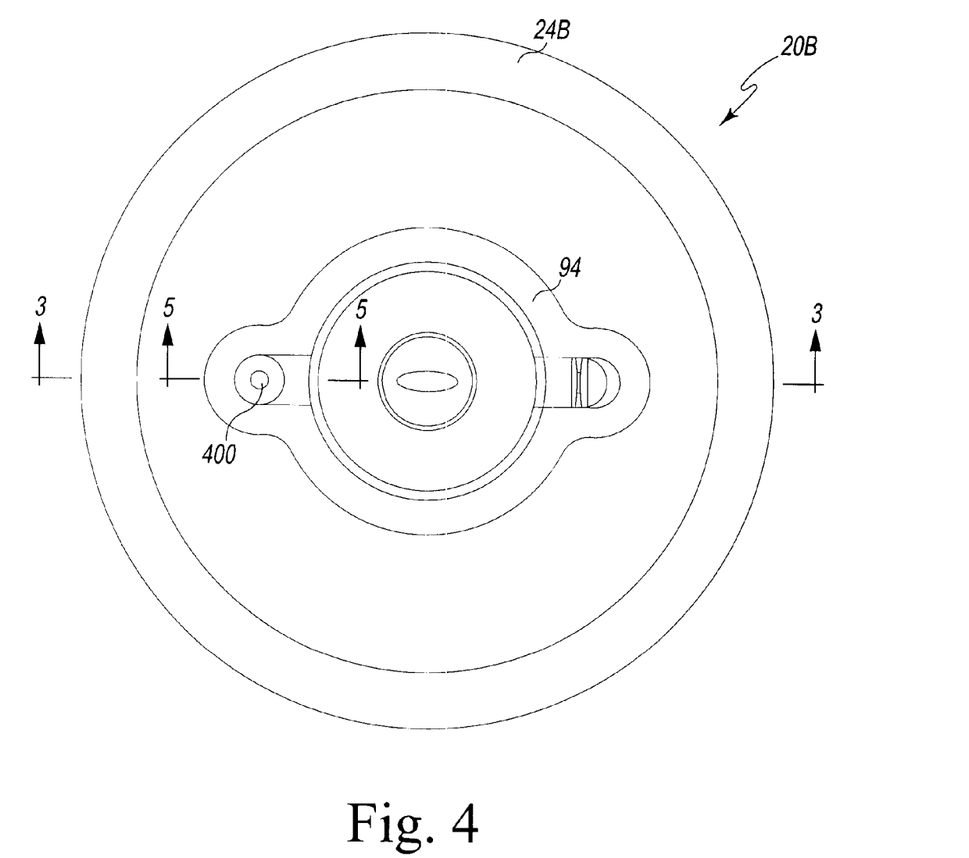
FIG. 4 is a top view of a typical food spinning apparatus bowl cover incorporating an embodiment of the present invention.

More particularly, concerning the embodiment of FIG. 3, the salad spinner 20B includes a drive member 30 with a reciprocating handle structure 94. While the salad spinner 20B is illustrated and described with a pump-like mechanism of the type shown in the aforementioned patents, the salad spinner 20B of the present invention can be used with, and is therefore not limited to, any particular type of mechanism for effectuating rotational movement of the basket 26A within the bowl 22. The bowl cover 24B is further modified, as can be seen from the top view of FIG. 4, to accommodate the drive assembly 30 and the brake actuator assembly 400. As compared to the concave annular surface portion 60 of the basket lid cover 28 shown in FIG. 2, the modified basket lid cover 28B of FIG. 3 has an angled annular surface portion 60B to allow engagement of brake actuator assembly 400 to stop and/or reduce rotational movement of the basket 26A, as shown in more detail in FIGS. 5A-5D and FIG. 6.

Figure 5A:
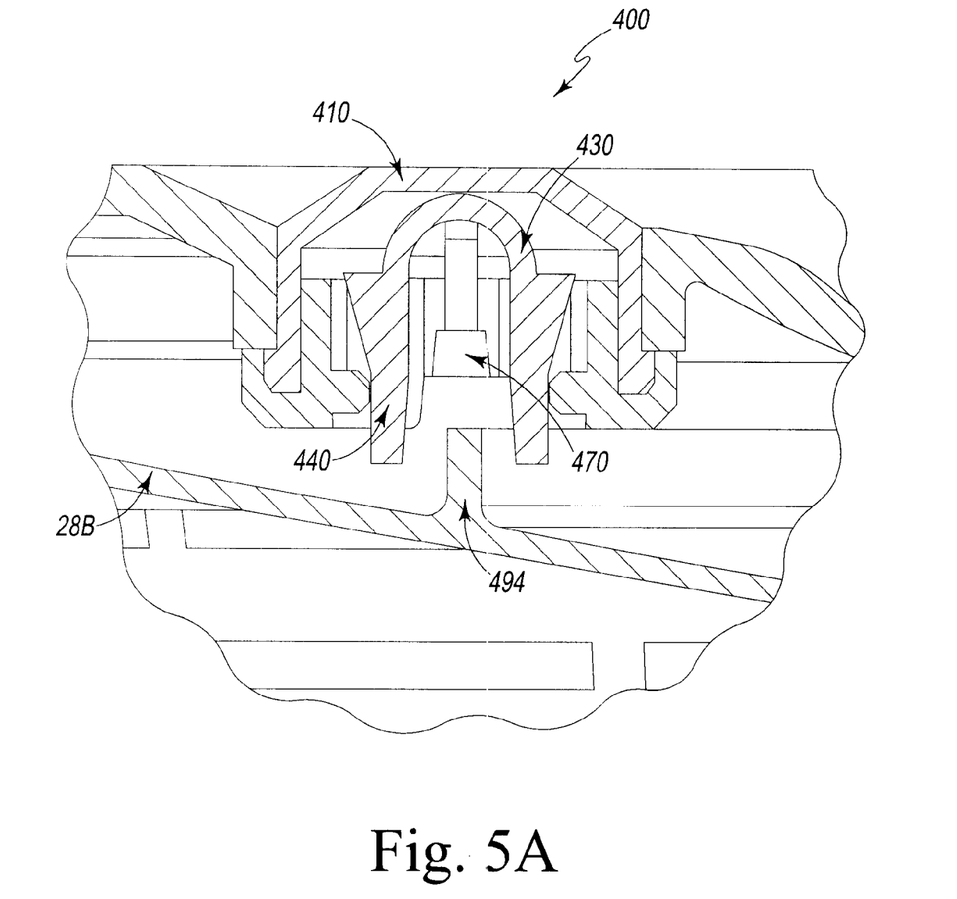
FIG. 5A-FIG. 5D are cross sectional views of a brake mechanism for a food spinning apparatus according to an illustrative embodiment of the present invention.
Figure 5B:
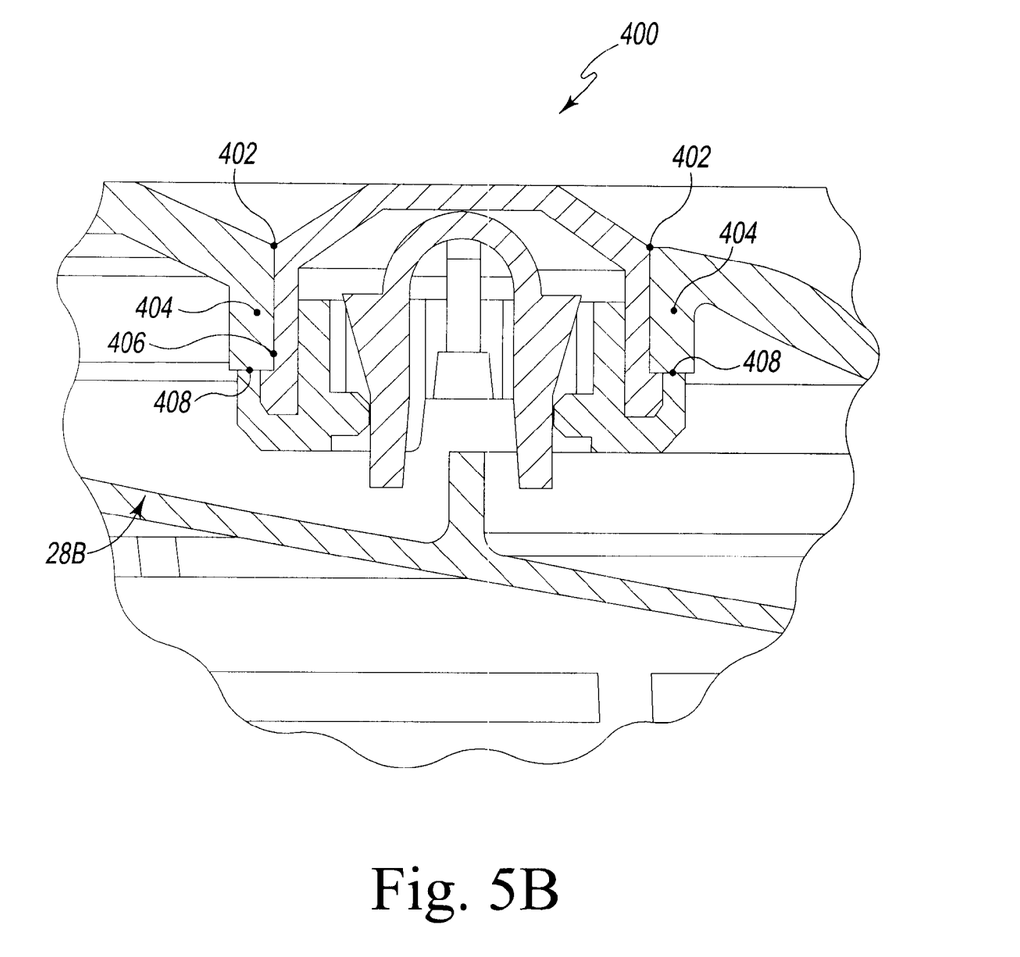
Figure 5C:
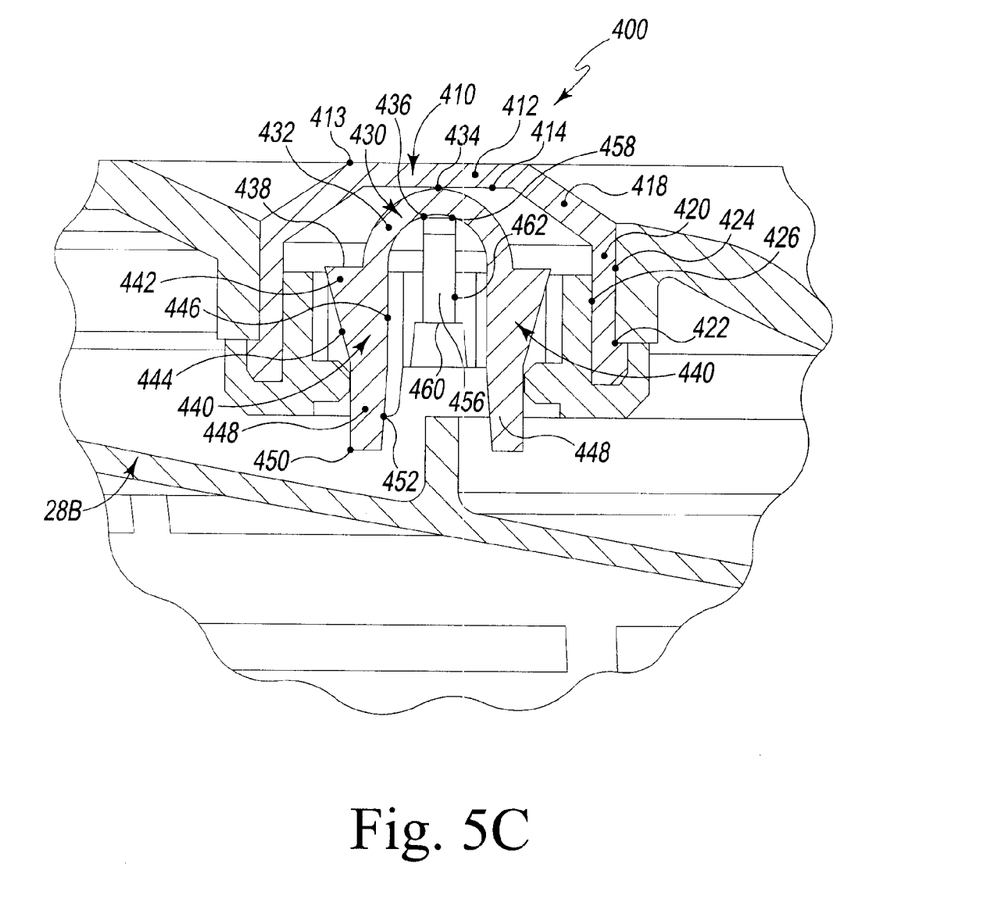
Figure 5D:
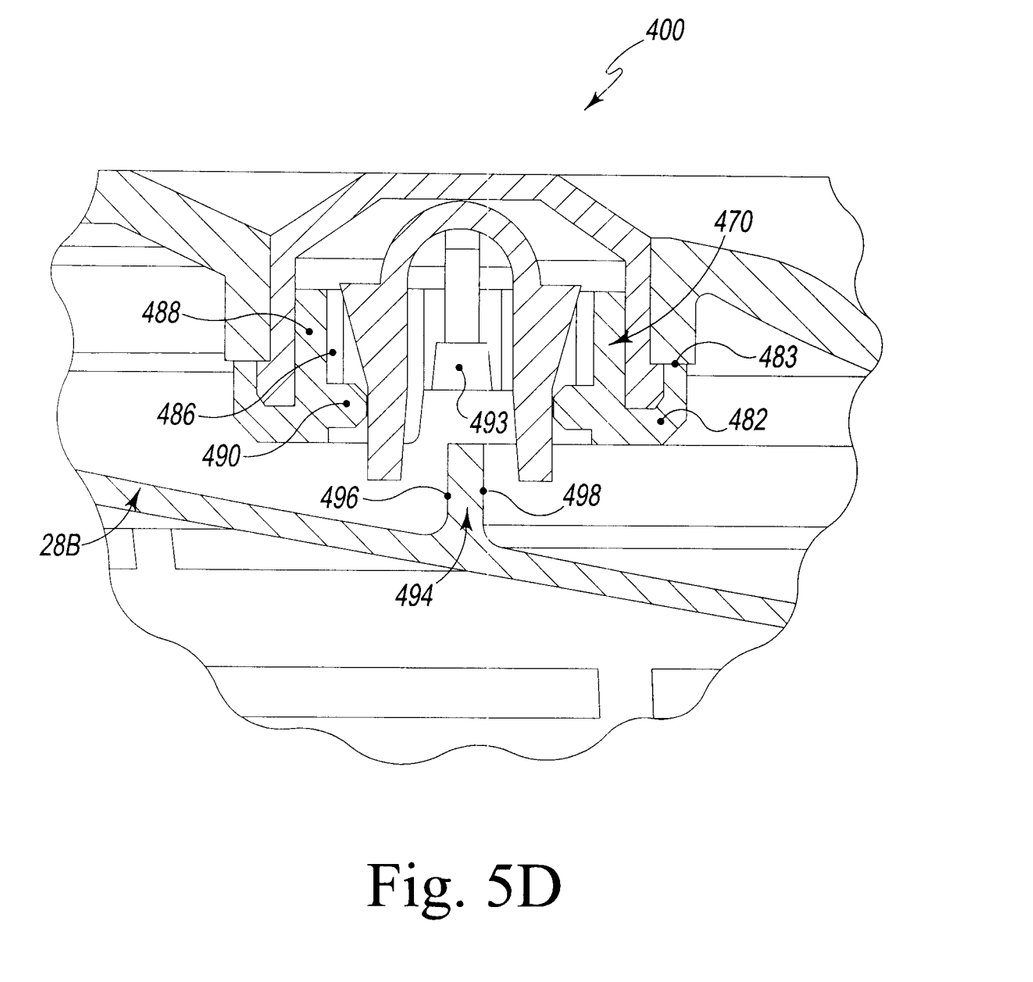
Figure 6:
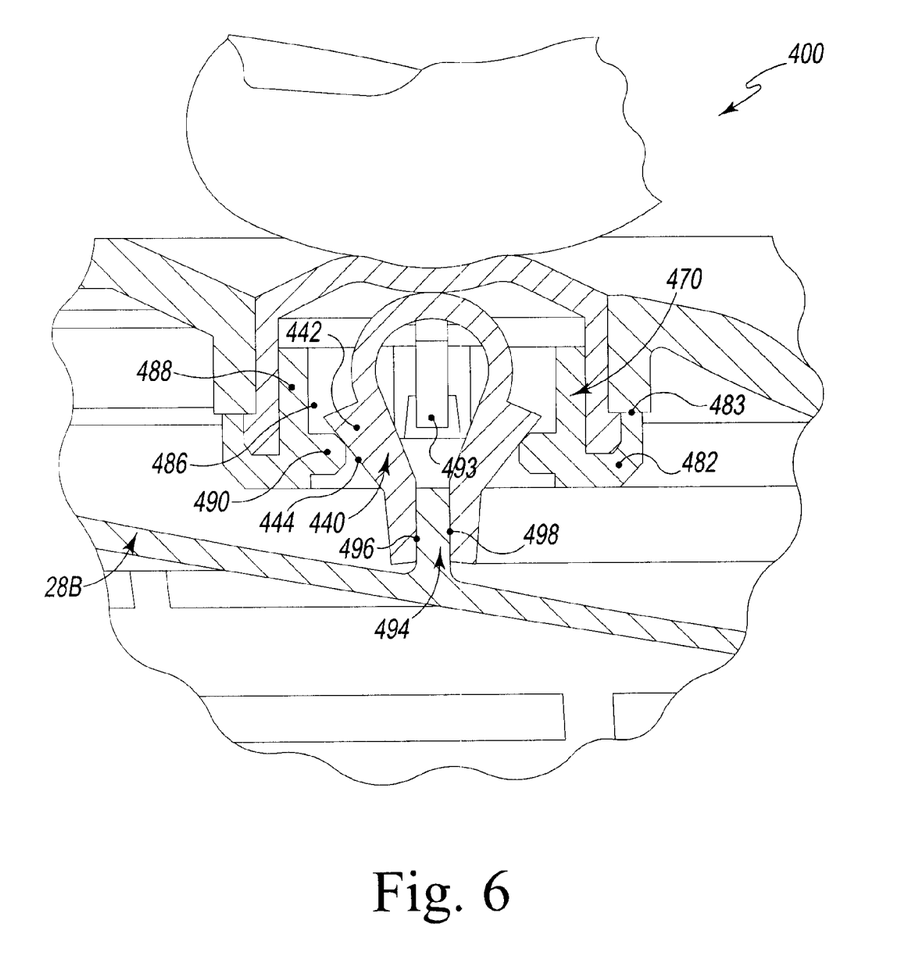
FIG. 6 is a cross sectional view of an embodiment of the present inventions showing the brake mechanism in a braking condition.

Referring to FIGS. 5A-5D, an embodiment of the brake actuator assembly 400 of the present invention is shown in more detail, which includes, in FIG. 5A, a brake button actuator 410, brake button 430, brake button finger or arm assembly 440, brake button guide channel member 470, and a basket lid including a generally annular upstanding ridge 494. FIG. 5B depicts an aperture 402 in the bowl cover 24B, which is adapted to receive brake actuator assembly 400, that includes cylindrical side wall 404 with inner and bottom surface portions 406, 408 to properly position brake button actuator 410 and brake button guide channel member 470 (shown in FIG. 5D) in aperture 402. FIG. 5C depicts a brake button actuator 410, made of a flexible and/or resilient material, such as a plastic, as including a circular top wall 412 with lower surface portion 414, and annular side and vertical walls 418, 420, with the vertical wall 420 including positioning ledge 422 with outer and inner surface portions 424, 426 to help fixedly position brake button actuator 410 between bottom surface portion 408 of cylindrical sidewall 404 of cover aperture 402, end walls 482 of lower body member 480 of brake button guide channel member 470, and support member 488 of lower body member 480 of brake button guide channel member 470, as shown in FIG. 5D. Although vertical wall 420 of brake button actuator 410 is fixedly positioned in cover aperture 420, (and thus fixedly positions the button actuator 410 as a whole in basket lid cover 28B), both circular top wall 412 and annular sidewall 418 of button actuator 410 are not fixedly positioned within the open area of aperture 420. More particularly, because the diameter of circular top wall 412 is less than the diameter of the lower area of annular sidewall 418 where it meets with vertical wall 420 and because of the outwardly sloping nature of annular sidewall 418 as it transitions from circular top wall 412 to vertical wall 420, the intersection point 413 between circular top wall 412 and annular sidewall 418 acts as a hinge when downward pressure is applied to circular top wall 412 (for example, by a users finger) due to the resilient material from which these walls are made, (as shown in FIG. 6). Likewise, when the downward pressure is released, the so called hinge at intersection point 413 and the flexible and resilient material of circular top wall 442 and annular sidewall 418 act together to apply a biasing force to bias both walls to their original, non-braking position as shown in FIG. 5C.

FIG. 5C further shows brake button 430, made also of a flexible and/or resilient material, such as a plastic, as including top arch member 432 with upper and lower surface portions 434, 436 and transition ledges 438 at a substantially 90 degree orientation to the end of top arch member 432 that lead to button finger or arm assembly 440. Top arch member 432 is attached at the apex of its upper surface portion 434 to the axial midpoint of lower surface portion 434 of circular top wall 442 so that brake button finger or arm assembly 440, as a whole, moves vertically and axially with circular top wall 412 and annular sidewall 418 of button actuator 410, when downward pressure is released from circular top wall 442, to return brake button finger or arm assembly 440, circular top wall 412, and annular sidewall 418, thereby biasing the brake assembly of the present invention to a non-braking condition, as shown in FIG. 5C. The button finger or arm assembly 440 further includes upper angled cam portions 442, lower caliper-like fingers 448, and positioning post 456 centrally located at the apex of top arch member 432 and attached at its upper surface portion 458 to lower surface portion 414 of top arch member 432, so that positioning post 456 extends substantially along parallel to the central axis of rotation A of basket 26A and is in substantial vertical alignment with basket lid annular upstanding ridge 494, as shown in FIG. 5D. Button fingers 448, like upstanding ridge 494 shown in FIG. 5D, also extend substantially along parallel to the central axis of rotation A. Upper angled cam portions 442 of button finger or arm assembly 440 shown in FIG. 5C include outer and inner surface portions 444, 446, lower button fingers 448 include outer and inner surface portions 450, 452, and positioning post 456 includes lower and side surface portions 460, 462.

FIG. 5D shows brake button guide channel member 470 as including a central axial guide portion 493 for slidably receiving the positioning post 456 of the brake button finger or arm assembly 440, and an outer axial guide portion 486 for slidably receiving the upper angled cam portions 442 and the lower button fingers 448 of the brake button finger or arm assembly 440. The guide channel member 470 further includes lower body member 482 with top surface portion 483, and a support member 488 with a cam actuator 490 extending into the outer axial guide portion 486 so that the inner surface portions 452 of the button fingers 448 can be compressed together against the outer surface portions 496, 498 of the upstanding ridge 494 as the button fingers 448 move downwardly through the guide channel member 470 to a braking position to frictionally engage, pinch or clamp the upstanding ridge 494 and stop and/or reduce rotation of the basket 26A, as shown in FIG. 6.

More particularly, FIG. 6 shows the button fingers 448 in their braking position resulting from the inwardly-directed forces exerted on the outer surface portions 444 of the upper angled cam portions 442 as the cam portions 442 ride over the cam actuators 490 that project into the outer axial guide portion 486 of the guide channel member 470, which is caused by depression of brake button 430 with, for example, a user's finger. To assure that effective and relatively even clamping forces are applied by the button fingers 448 to the rapidly spinning annular upstanding ridge 494 (both of which extend substantially along the central axis of rotation A), the positioning post 456 is axially aligned with the upstanding ridge 494 and the central axial guide portion 493 of the guide channel member 470. Likewise, the "unbraking" of brake button finger or arm assembly 440 and, thus, the "unclamping" of button fingers 448 from annular upstanding ridge 494, result from the resiliency of button actuator 410 and the sloped nature of its annular sidewall 418 and its intersection point 413 with circular top wall 442, that provide together a sufficient "springing" or biasing force to return brake finger or arm assembly 440 to its original position once finger pressure, for example, is removed from button actuator 410.

A method for reducing a rotational speed of a basket assembly disposed in a container is also disclosed. The container includes a bowl having a sidewall terminating at an edge defining an opening and a cover removably coupled to the bowl and substantially covering the opening, wherein the basket assembly is rotatable relative to the container about an axis of rotation. The basket assembly includes a basket having a sidewall terminating at a top edge and a lid removably coupled to the top edge of the basket. In an embodiment, the method comprises causing the basket assembly to rotate relative to the container, and axially translating a brake button disposed in the cover, thereby causing a pair of pinching arms to frictionally engage an annular ridge disposed on a top surface of the lid toward the cover, the ridge coaxially positioned about the axis of rotation. In an embodiment, the step of axially translating a brake button disposed in the cover includes applying downwardly directed force to the brake button.

While the disclosure has been described and illustrated in connection with preferred embodiments, many variations and modifications will be evident to those skilled in the art and may be made without departing from the spirit and scope of the disclosure. The disclosure is thus not to be limited to the precise details of methodology or construction set forth above as such variations and modification are intended to be included within the scope of the disclosure.

The claimed disclosure is:

1. A device for drying food comprising:
   a container including a bowl having a sidewall terminating at an edge defining an opening and a cover removably coupled to the bowl and substantially covering the opening;
   a basket assembly disposed in the bowl and rotatable relative to the container about an axis of rotation, the basket assembly including a basket having a sidewall with perforations and terminating at a top edge and a lid releasably coupled to the top edge of the basket;
   an upstanding generally annular ridge extending from a top surface of the lid toward the cover, the ridge disposed substantially coaxially about the axis of rotation; and
   a brake assembly including a brake button carried by the cover, wherein the brake button is operably coupled to pinching arms extending substantially parallel to the axis of rotation and movable between a non-braking position and a braking position wherein the pinching arms frictionally engage the annular ridge upon translation of the brake button relative to the lid, wherein the pinching arms flex toward each other when moving toward the braking position.

2. The device of claim 1, wherein axial translation of the brake button toward the lid causes the pinching arms to be disposed in the braking position, wherein the pinching arms frictionally engage the circular annular ridge upon translation of the brake button relative to the lid.

3. The device of claim 2, wherein the pinching arms are adapted to pinch the annular ridge upon depression of the brake button.

4. The device of claim 1, wherein the cover includes a guide channel having at least one cam surface, and wherein the pinching arms extend through the guide channel, the pinching arms including ramped surfaces adapted to abut the cam surface of the guide channel.

5. The device of claim 1, further comprising an actuator button disposed over the brake button, at least a portion of the actuator being a button movable and adapted to abut the brake button to cause the brake button to move toward the lid.

6. The device of claim 1, wherein the brake button and pinching arms are biased to a non-braking condition.

7. The device of claim 6, wherein the pinching arms are constructed of a resilient material.

8. A device for drying food comprising:
   a container including a bowl having a sidewall terminating at an edge defining an opening and a cover removably coupled to the bowl and substantially covering the opening;
   a basket assembly disposed in the bowl and rotatable relative to the container about an axis of rotation, the basket assembly including a basket having perforations and a sidewall terminating at a top edge and a lid releasably coupled to the top edge of the basket;
   an annular upstanding ridge extending from a top surface of the lid toward the cover, the ridge being substantially coaxial about the axis of rotation;
   a brake button carried by the cover;
   pinching arms operably coupled to the brake button and movable between a non-braking position and a braking position to frictionally engage the annular ridge upon axial translation of the brake button toward to the lid, wherein the brake button and pinching arms are biased toward the non-braking position and flex toward each other when moving toward the braking position, wherein the brake button is vertically aligned with a location on the annular ridge engaged by the pinching arms when the pinching arms are in the braking position.

9. The device of claim 8, wherein the cover includes a guide channel having a cam surface, and wherein the pinching arms extend through the guide channel, the pinching arms including ramped surfaces adapted to abut the cam surface of the guide channel and flex-toward each other in response to engagement with the cam surface upon translation of the brake button toward the lid.

10. The device of claim 8, wherein the pinching arms are adapted to reduce the rotational speed of the basket assembly when disposed in a braking position by applying a frictional force to the annular ridge upon translation of the brake button toward the lid.

11. The device of claim 8, wherein the pinching arms are constructed of a resilient material.

12. A method for reducing a rotational speed of a basket assembly disposed in a container including a bowl having a sidewall terminating at an edge defining an opening and a cover removably coupled to the bowl and substantially covering the opening, wherein the basket assembly is rotatable relative to the container about an axis of rotation, the basket assembly includes a basket having a sidewall terminating at a top edge and a lid removably coupled to the top edge of the basket, the method comprising:
   causing the basket assembly to rotate relative to the container;
   axially translating a brake button disposed in the cover, thereby causing pinching arms, which extend parallel to the axis of rotation, to frictionally engage an upstanding annular ridge disposed on a top surface of the lid.

13. The method of claim 12, wherein the step of axially translating a brake button disposed in the cover includes applying a downwardly directed force to the brake button.

14. The device of claim 1, wherein one of the pinching arms engages a surface of the annular ridge that faces the axis of rotation when in the braking position.

15. The device of claim 1, wherein the brake button is vertically aligned with a location on the annular ridge engaged by the pinching arms when the pinching arms are in the braking position.

16. The device of claim 8, wherein one of the pinching arms engages a surface of the annular ridge that faces the axis of rotation when in the braking position.

17. The device of claim 16, wherein the pinching arms extend substantially parallel to the axis of rotation.

* * * * *

UNITED STATES PATENT AND TRADEMARK OFFICE
CERTIFICATE OF CORRECTION

PATENT NO. : 8,539,693 B2  
APPLICATION NO. : 13/072822  
DATED : September 24, 2013  
INVENTOR(S) : Marco Perry et al.

Page 1 of 1

It is certified that error appears in the above-identified patent and that said Letters Patent is hereby corrected as shown below:

In the Claims

Column 7, line 30 (claim 8, line 19), delete "brake button and"

Signed and Sealed this
Twenty-ninth Day of October, 2013

Teresa Stanek Rea
*Deputy Director of the United States Patent and Trademark Office*